United States Patent
Meyer et al.

(10) Patent No.: US 9,150,684 B2
(45) Date of Patent: Oct. 6, 2015

(54) HIGH RESILIENCE POLYURETHANE FOAMS COMPRISING CASTOR OIL

(75) Inventors: Andre Meyer, Brockum (DE);
Heinz-Dieter Lutter, Lembruch (DE);
Christoph Leseberg, Brockum (DE);
Annika Johann-Krone,
Stemwede-Dielingen Dielingen (DE)

(73) Assignee: BASF SE, Ludwigshafen (DE)

( * ) Notice: Subject to any disclaimer, the term of this patent is extended or adjusted under 35 U.S.C. 154(b) by 439 days.

(21) Appl. No.: 13/478,468

(22) Filed: May 23, 2012

(65) Prior Publication Data

US 2012/0302652 A1      Nov. 29, 2012

Related U.S. Application Data

(60) Provisional application No. 61/490,096, filed on May 26, 2011.

(51) Int. Cl.
*C08G 18/66* (2006.01)
*C08G 101/00* (2006.01)

(52) U.S. Cl.
CPC ...... *C08G 18/6696* (2013.01); *C08G 2101/005* (2013.01); *C08G 2101/0008* (2013.01); *C08G 2101/0083* (2013.01)

(58) Field of Classification Search
CPC .......... C08G 18/10; C08G 18/12; C08G 18/14
USPC ........................................... 521/159
See application file for complete search history.

(56) References Cited

U.S. PATENT DOCUMENTS

| | | |
|---|---|---|
| 3,304,273 A | 2/1967 | Stamberger |
| 3,383,351 A | 5/1968 | Stamberger |
| 3,523,093 A | 8/1970 | Stamberger |
| 2007/0219282 A1* | 9/2007 | Harre et al. ............ 521/155 |
| 2009/0286897 A1 | 11/2009 | Andries et al. |
| 2010/0227938 A1 | 9/2010 | Bauer et al. |

FOREIGN PATENT DOCUMENTS

| | | |
|---|---|---|
| DE | 1 152 536 | 8/1963 |
| DE | 1 152 537 | 8/1963 |
| DE | 10 2008 030 940 A1 | 1/2010 |
| EP | 0 250 351 A2 | 12/1987 |
| JP | 2006-104404 A | 4/2006 |
| JP | 2010-174111 A | 8/2010 |
| WO | WO 2009/032894 A1 | 3/2009 |
| WO | WO 2012/160024 A1 | 11/2012 |

OTHER PUBLICATIONS

European Search Report issued Oct. 12, 2011 in Patent Application No. 11 16 7691.

* cited by examiner

*Primary Examiner* — Melissa Rioja
(74) *Attorney, Agent, or Firm* — Oblon, McClelland, Maier & Neustadt, L.L.P.

(57) ABSTRACT

A process for producing high resilience flexible polyurethane foams. The process includes forming a mixture of (a) isocyanate prepolymer, (b) polymeric compounds having isocyanate-reactive groups, (c) castor oil, (d) optionally chain-extending and/or crosslinking agents, (e) catalysts, (f) blowing agents, and optionally (g) additives, and reacting the mixture to form the flexible polyurethane foam. More than 5 wt % of (c) is used, based on the total weight of components (b) to (g), and (a) is obtained by mixing diphenylmethane diisocyanate (a1) and polyol 1 (a2) and also optionally further polyols, chain extenders and/or crosslinkers, where (a2) includes a polyalkylene oxide polyol having a hydroxyl number of 30 to 60, an average functionality of 2.3 to 3.2 and a propylene oxide fraction, based on the alkylene oxide content, of 70 to 100 wt %. A polyurethane foam obtained by the process, and the use of such a foam as an auto seat.

10 Claims, No Drawings

HIGH RESILIENCE POLYURETHANE FOAMS COMPRISING CASTOR OIL

The present invention relates to a process for producing high resilience flexible polyurethane foams which comprises (a) isocyanate prepolymer, (b) polymeric compounds having isocyanate-reactive groups, (c) castor oil, (d) optionally chain-extending and/or crosslinking agents, (e) catalysts, (f) blowing agents, and also optionally (g) additives, being mixed to form a reaction mixture and reacted to form the flexible polyurethane foam, wherein more than 5 wt % of castor oil (c) is used, based on the total weight of components (b) to (g), and the isocyanate prepolymer (a) is obtained by mixing diphenylmethane diisocyanate (a1) and polyol 1 (a2) and also optionally further polyols, chain extenders and/or crosslinkers, wherein the polyol 1 (a2) comprises a polyalkylene oxide polyol having a hydroxyl number of 30 to 60, an average functionality of 2.3 to 3.2 and a propylene oxide fraction, based on the alkylene oxide content, of 70 to 100 wt %. The present invention further relates to high resilience polyurethane foams obtainable by such a process, and the use of these foams as auto seats.

High resilience polyurethane foams are known and are used for example as upholstery materials in the furniture industry, as mattresses or in the manufacture of auto seats. Ecological concerns and the prospect of dwindling reserves of fossil raw materials are driving the search, in many sectors, for solutions whereby renewable raw materials can be substituted for the fossil ones. In the production of polyurethane integral foams for instance, polyols based on fossil raw materials are being replaced by polyols based on renewable raw materials.

JP 2010174111 describes a process for producing polyurethane foams which utilizes 45-75 wt % of castor oil in the base polyol component in the presence of polyester polyol and TDI (80:20 2,4-TDI:2,6-TDI mixtures) as isocyanate component. This process leads to foams of low resilience.

US 2009286897 describes a visco-elastic polyurethane foam having a DIN EN ISO 8307 resilience of 14%, said foam being obtained from an isocyanate prepolymer based on monomeric and more-nuclear MDI and also from a polyetherol having a functionality of 3, an OH number of 30 and an ethylene oxide content of 15 wt %.

DE102008030940 describes a flexible closed-cell PU foam comprising OH-containing oil, preferably castor oil, wherein said oil becomes incorporated in the PU. The foam is shrinkage-free, but predominantly closed-cell and hence offers only minimal comfort, since moisture cannot be transported away.

Use of castor oil in the production of high resilience polyurethane foams is disadvantageous because of the short chain length and high functionality. This tends to make the foams produced therefrom more rigid. To avoid this, JP 2006104404 proposes using an ethoxylated castor oil in the production of polyurethane foams. However, this requires an additional step and hence leads to a complex and costly method of production.

WO 2009032894 describes a further approach for reducing the rigidity of the foams obtained and at the same time using a high proportion of biobased isocyanate-reactive component. Isocyanate-reactive natural products having a functionality of less than 1.5 are used. But this leads to reduced crosslink density and hence to important physical properties of the foam, such as tensile strength and tear strength, becoming worse.

The problem addressed by the present invention was that of providing a simple and easy to process high resilience flexible polyurethane foam of low compressive strength wherein some of the isocyanate-reactive component is based on renewable raw materials.

The problem addressed by the present invention is solved by a high resilience polyurethane foam obtained by (a) isocyanate prepolymer, (b) polymeric compounds having isocyanate-reactive groups, (c) castor oil, (d) optionally chain-extending and/or crosslinking agents, (e) catalysts, (f) blowing agents, and also optionally (g) additives, being mixed to form a reaction mixture and reacted to form the flexible polyurethane foam, wherein more than 5 wt % of castor oil (c) is used, based on the total weight of components (b) to (g), and the isocyanate prepolymer (a) is obtained by mixing diphenylmethane diisocyanate (a1) and polyol 1 (a2) and also optionally further polyols, chain extenders and/or crosslinkers, wherein the polyol 1 (a2) comprises a polyalkylene oxide polyol having a hydroxyl number of 30 to 60, an average functionality of 2.3 to 3.2 and a propylene oxide fraction, based on the alkylene oxide content, of 70 to 100 wt %.

What is referred to herein as a high resilience polyurethane foam is a polyurethane foam having a density of less than 100 g/l, preferably in the range from 20 to 70 g/l, more preferably in the range from 30 to 60 g/l and especially in the range from 40 to 55 g/l and a DIN EN ISO 8307 resilience of greater than 40%, preferably greater than 45 and more preferably greater than 50%. High resilience polyurethane foams according to the present invention further preferably have a DIN EN ISO 2439 40% deflection compressive strength of less than 10 kPa, more preferably of less than 8 kPa and especially of less than 6 kPa, and a DIN EN ISO 1856 compression set (measured at 70° C., 50% compression for 22 hours) of preferably below 30%, more preferably below 20% and especially below 15%.

Isocyanate prepolymer (a) of the present invention is prepared by mixing diphenylmethane diisocyanate (a1) and polyol 1 (a2) and also optionally further polyols and/or chain extenders.

Diphenylmethane diisocyanate (a1) may be monomeric diphenyl diisocyanate selected from the group consisting of 2,2'-diphenylmethane diisocyanate, 2,4'-diphenylmethane diisocyanate or 4,4'-diphenylmethane diisocyanate or mixtures of two or all three isomers and also mixtures of one or more monomeric diphenylmethane diisocyanates with higher-nuclear homologs of diphenylmethane diisocyanate. The viscosity of diphenylmethane diisocyanate (a1) at 20° C. is preferably less than 200 mPas, more preferably less than 150 mPas and more preferably less than 100 mPas.

It is preferable for the diphenylmethane diisocyanate (a1) to comprise from 50 to 80 wt % and more preferably from 60 to 75 wt % of monomeric diphenylmethane diisocyanate and from 20 to 50 wt % and more preferably from 25 to 40 wt % of higher-nuclear homologs of diphenylmethane diisocyanate, all based on the total weight of diphenylmethane diisocyanate (a1). The monomeric diphenylmethane diisocyanate here preferably comprises from 70 to 85 wt % of the 4,4'-isomer of diphenylmethane diisocyanate and from 15 to 30 wt % of 2,4'-isomer of diphenylmethane diisocyanate, all based on the total weight of monomeric diphenylmethane diisocyanate.

Polyol 1 (a2) comprises a polyalkylene oxide polyol having a hydroxyl number of 30 to 60 and preferably 40 to 50 mg KOH/g, an average functionality of 2.3 to 3.2, preferably 2.5 to 3.0 and especially 2.6 to 2.8 and a propylene oxide fraction, based on the alkylene oxide content, of 90 to 100%, preferably 95 to 100% and especially 100 wt %. When polymer 1 in addition to propylene oxide comprises further alkylene oxides, ethylene oxide is preferably concerned. Any known starter molecule described under (b) can be used. Trifunctional starter molecules, such as glycerol or trimethylolpropane, are preferable. The general method of making polyols 1 (a1) corresponds to that described under (b) for polyetherols.

In addition to the recited polyols 1 (a1), further polyols, chain extenders and/or crosslinking agents may optionally be used for preparing the isocyanate prepolymers (a). Such polyols, chain extenders and/or crosslinking agents are described under (b) and (c). Preferably, the isocyanate prepolymers (a) are prepared without using chain-extending agents and/or crosslinking agents.

In addition to polyol 1 (a1), a polyol 2 is preferably also used for preparing the isocyanate prepolymer (a). Polyol 2 is preferably a polyalkylene oxide polyol having a hydroxyl number of 30 to 60, preferably 40 to 60, an average functionality of 2.3 to 3.2 preferably 2.5 to 3.0 and especially 2.6 to 2.8 and an ethylene oxide fraction, based on the alkylene oxide content, of 70 to 90 wt %, based on the alkylene oxide content. The alkylene oxide is preferably a mixture of ethylene oxide and propylene oxide. Any known starter molecule described under (b) can be used. Trifunctional starter molecules, such as glycerol or trimethylolpropane, are preferable. The general method of making polyols 2 corresponds to that described under (b) for polyetherols.

The isocyanate prepolymer is prepared by mixing the starting materials: diphenylmethane diisocyanate (a1), polyol 1 (a2) and optionally further polyols, chain-extending agents and/or crosslinking agents. This is preferably done in a ratio such that the NCO content of the prepolymer is in the range from 28 to 33 wt % and preferably in the range from 29 to 31 wt %. The proportions used here are preferably from 75 to 99 wt % of diphenylmethane diisocyanate (a1), preferably from 1 to 10 wt % of polyol 1 (a2) and from 0 to 15 wt %, preferably 2 to 15 and especially 4 to 12 wt % of polyol 2. The mixture is preferably heated to temperatures of 30 to 100° C. and more preferably about 80° C.

Polymeric compounds used having isocyanate-reactive groups (b) include the compounds known and customary for preparing flexible polyurethane foams. Preferably included are polyester alcohols and/or polyether alcohols having a functionality of 2 to 8, especially of 2 to 6 and preferably 2 to 4 and an average equivalent molecular weight in the range from 400 to 3000 g/mol and preferably in the range from 1000 to 2500 g/mol. Polyether alcohols are used in particular.

Polyether alcohols are obtainable by known methods, usually via catalytic addition of alkylene oxides, especially ethylene oxide and/or propylene oxide, onto H-functional starter substances, or via condensation of tetrahydrofuran. When alkylene oxides are used, the products are also known as polyalkylene oxide polyols. Useful H-functional starter substances include especially polyfunctional alcohols and/or amines. Preference is given to using water, dihydric alcohols, for example ethylene glycol, propylene glycol, or butane diols, trihydric alcohols, for example glycerol or trimethylolpropane, and also more highly hydric alcohols, such as pentaerythritol, sugar alcohols, for example sucrose, glucose or sorbitol. Preferable amines are aliphatic amines having up to 10 carbon atoms, for example ethylenediamine, diethylenetriamine, propylenediamine, and also amino alcohols, such as ethanolamine or diethanolamine. The alkylene oxides used are preferably ethylene oxide and/or propylene oxide, while polyether alcohols used for preparing flexible polyurethane foams frequently have an ethylene oxide block added at the chain end. Useful catalysts for the addition reaction of alkylene oxides include especially basic compounds in that potassium hydroxide is industrially the most important one. When the level of unsaturated constituents in the polyether alcohols is to be low, di- or multi metal cyanide compounds, so-called DMC catalysts, can also be used as catalysts. High resilience flexible polyurethane foams are produced using especially two- and/or three-functional polyalkylene oxide polyols.

Useful compounds having two or more active hydrogen atoms further include polyester polyols obtainable for example from organic dicarboxylic acids having 2 to 12 carbon atoms, preferably aliphatic dicarboxylic acids having 8 to 12 carbon atoms, and polyhydric alcohols, preferably diols, having 2 to 12 carbon atoms and preferably 2 to 6 carbon atoms. Useful dicarboxylic acids include for example succinic acid, glutaric acid, adipic acid, suberic acid, azelaic acid, sebacic acid, decanedicarboxylic acid, maleic acid, fumaric acid, phthalic acid, isophthalic acid, terephthalic acid and the isomeric naphthalene dicarboxylic acids. Use of adipic acid is preferable. The dicarboxylic acids can be used not only individually but also mixed with one another. Instead of the free dicarboxylic acids it is also possible to use the corresponding dicarboxylic acid derivatives, for example dicarboxylic esters of alcohols having 1 to 4 carbon atoms or dicarboxylic anhydrides.

Examples of alcohols having two or more hydroxyl groups and especially diols are: ethanediol, diethylene glycol, 1,2-propanediol, 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol, 1,6-hexanediol or mixtures of two or more thereof, especially mixtures of 1,4-butanediol, 1,5-pentanediol and 1,6-hexanediol. It is further possible to use polyester polyols formed from lactones, e.g., ε-caprolactone, or hydroxy carboxylic acids, e.g., w-hydroxycaproic acid and hydroxybenzoic acids. The use of dipropylene glycol is preferred.

The hydroxyl number of polyester alcohols is preferably in the range between 40 and 100 mg KOH/g.

Useful polyols further include polymer-modified polyols, preferably polymer-modified polyesterols or polyetherols, more preferably graft polyetherols/polyesterols, especially graft polyetherols. A polymer-modified polyol is a so-called polymer polyol which typically has a preferably thermoplastic polymer content of 5 to 60 wt %, preferably 10 to 55 wt %, more preferably 30 to 55 wt % and especially 40 to 50 wt %.

Polymer polyols are described for example in EP-A-250 351, DE 111 394, U.S. Pat. No. 3,304,273, U.S. Pat. No. 3,383,351, U.S. Pat. No. 3,523,093, DE 1 152 536 and DE 1 152 537 and are typically obtained by free-radical polymerization of suitable olefinic monomers, for example styrene, acrylonitrile, (meth)acrylates, (meth)acrylic acid and/or acrylamide, in a grafting-base polyol, preferably polyesterol or polyetherol. The sidechains are generally formed by free radicals transferring from growing polymer chains to polyols. The polymer polyol, in addition to the graft copolymers, predominantly comprises the homopolymers of the olefins, dispersed in unmodified polyol.

One preferable embodiment utilizes acrylonitrile and styrene, especially styrene only, as monomers. The monomers are optionally polymerized in the presence of further monomers, of a macromer, of a moderator and using a free-radical initiator, usually azo or peroxide compounds, in a polyesterol or polyetherol as continuous phase.

When the high molecular weight compound b) comprises polymer polyol, the latter is preferably present together with further polyols, for example polyetherols, polyesterols or mixtures of polyetherols and polyesterols. Preferably, no polymer polyol is used.

It is particularly preferable for polyol b to comprise essentially exclusively polyether alcohols having a functionality of 2 to 4, preferably 2.5 to 3.5 and an average equivalent molecular weight of 400 to 3000, preferably 1000 to 2500 g/mol. Here "essentially" is to be taken as meaning that less than 30 wt %, more preferably less than 20, even more preferably less than 10 and especially no further polyols are used. The polyether alcohols are preferably polyether alcohols obtained by reaction of ethylene oxide and/or propylene oxide as alkylene oxides with starter molecules and in which the ethylene oxide content is preferably from 40 to 5, more preferably 30 to 8 and especially 20 to 10 wt %, based on the total weight of ethylene oxide and propylene oxide.

Castor oil (c) is a vegetable oil obtained from the seeds of the tropical miracle tree (*Ricinus communis*) and bears CAS No. 08001-79-4. It is a mixture consisting essentially of triglycerides of fatty acids in that it comprises about 70 wt % of triglycerides of ricinoleic acid, about 27 wt % of triglycerides formed from two molecules of ricinoleic acid and one molecule of a further fatty acid, and about 3 wt % of triglycerides formed from one molecule of ricinoleic acid and two molecules of a further fatty acid. Further fatty acids include for example linoleic acid, oleic acid, palmitic acid and stearic acid. Composition particulars vary with the provenience. This isocyanate-reactive natural oil has an average functionality of about 2.7 and an OH number of 160-185 mg KOH/g.

The present invention utilizes castor oil (c) in an amount of above 5 wt %, preferably from 10 to 30 wt %, more preferably from 12 to 25 wt % and especially from 15 to 20 wt %, all based on the total weight of components (b) to (g).

The chain-extending agents and/or crosslinking agents (d) used are substances having a molecular weight of below 500 g/mol and preferably in the range from 60 to 400 g/mol, chain extenders having 2 isocyanate-reactive hydrogen atoms and crosslinkers having 3 isocyanate-reactive hydrogen atoms. These can be used individually or in the form of mixtures. Preference is given to using diols and/or triols having molecular weights less than 400, more preferably in the range from 60 to 300 and especially in the range from 60 to 150. Possibilities are for example aliphatic, cycloaliphatic and/or aromatic diols with 2 to 14 and preferably 2 to 10 carbon atoms, such as ethylene glycol, 1,3-propanediol, 1,10-decanediol, o-dihydroxycyclohexane, m-dihydroxycyclohexane, p-dihydroxycyclohexane, diethylene glycol, dipropylene glycol and preferably 1,4-butanediol, 1,6-hexanediol and bis(2-hydroxyethyl)hydroquinone, triols, such as 1,2,4-trihydroxycyclohexane, 1,3,5-trihydroxycyclohexane, glycerol and trimethylolpropane, and low molecular weight hydroxyl-containing polyalkylene oxides based on ethylene oxide and/or 1,2-propylene oxide and the aforementioned diols and/or triols as starter molecules. Particular preference for use as chain extenders (d) is given to monoethylene glycol, 1,4-butanediol and/or glycerol.

When chain-extending agents, crosslinking agents or mixtures thereof are used, the amounts in which they are used are advantageously in the range from 1 to 60 wt %, preferably in the range from 1.5 to 50 wt % and especially in the range from 2 to 40 wt %, based on the weight of components (b) and (d).

Useful catalysts (e) for preparing the high resilience polyurethane foams are preferably compounds which greatly speed up the reaction of the hydroxyl-containing compounds of components (b), (c) and optionally (d) with the polyisocyanates (a). Examples are amidines, such as 2,3-dimethyl-3,4,5,6-tetrahydropyrimidine, tertiary amines, such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexanediamine, pentamethyldiethylene-triamine, tetramethyldiaminoethyl ether, bis(dimethylaminopropyl) urea, dimethylpiperazine, 1,2-dimethylimidazole, 1-azabicyclo-(3,3,0)-octane and preferably 1,4-diazabicyclo-(2,2,2)-octane and alkanolamine compounds, such as triethanolamine, triisopropanolamine, N-methyl-diethanolamine, N-ethyldiethanolamine and dimethylethanolamine. Similarly suitable are organic metal compounds, preferably organic tin compounds, such as tin(II) salts of organic carboxylic acids, e.g., tin(II) acetate, tin(II) octoate, tin(II) ethylhexanoate and tin(II) laurate, and the dialkyltin(IV) salts of organic carboxylic acids, for example dibutyltin diacetate, dibutyltin dilaurate, dibutyltin maleate and dioctyltin diacetate, and also bismuth carboxylates, such as bismuth(III) neodecanoate, bismuth 2-ethylhexanoate and bismuth octanoate, or mixtures thereof. The organic metal compounds can be used alone or preferably in combination with strong basic amines. When component (b) is an ester, it is preferable to use exclusively amine catalysts.

Preference is given to using from 0.001 to 5 wt % and especially from 0.05 to 2 wt % of catalyst or catalyst combination, based on the weight of component (b).

Polyurethane foams are further produced in the presence of blowing agents (f). By way of blowing agents (f) it is possible to use chemically acting blowing agents and/or physically acting compounds. Chemical blowing agents are compounds which react with isocyanate to form gaseous products, for example water or formic acid. Physical blowing agents are compounds that have been dissolved or emulsified in the starting materials of polyurethane synthesis and vaporize under the conditions of polyurethane formation. Examples are hydrocarbons, halogenated hydrocarbons and other compounds, for example perfluorinated alkanes, such as perfluorohexane, chlorofluorocarbons, and ethers, esters, ketones and/or acetals, for example (cyclo)aliphatic hydrocarbons having 4 to 8 carbon atoms, hydrofluorocarbons, such as Solkane® 365 mfc, or gases, such as carbon dioxide. In one preferable embodiment, the blowing agent used is a mixture of these blowing agents, comprising water and more preferably exclusively water.

The level of physical blowing agents (f), if present, in a preferable embodiment is in the range between 1 and 20 wt % and especially 5 and 20 wt %, the amount of water is preferably in the range between 0.5 and 10 wt % and especially between 1 and 5 wt %.

Useful auxiliaries and/or additives (g) include for example surface-active substances, foam stabilizers, cell regulators, external and internal release agents, fillers, pigments, hydrolysis control agents and also fungistats and bacteriostats.

Further particulars about the starting materials used appear for example in Kunststoffhandbuch, volume 7, Polyurethanes, edited by Günter Oertel, Carl-Hanser-Verlag, Munich, 3rd edition 1993, chapter 5, Flexible polyurethane foams.

Industrial production of polyurethane foams typically comprises combining the compounds having two or more active hydrogen atoms b) and one or more of the starting materials c) to g) into a so-called polyol component, prior to the reaction with the isocyanate prepolymer (a).

To produce the high resilience polyurethane foams of the present invention, the polyisocyanate prepolymers are reacted with the polymeric compounds having isocyanate-reactive groups in the presence of the recited blowing agents, catalysts and auxiliary and/or additive agents (polyol component). The mixing ratios are chosen here such that the equivalence ratio of NCO groups of polyisocyanates (a) to the sum total of reactive hydrogen atoms of components (b), (c) and optionally (d) and (f) is in the range from 0.7 to 1.25:1 and preferably in the range from 0.80 to 1.15:1. A ratio of 1:1 here corresponds to an isocyanate index of 100.

The polyurethane foams of the present invention are preferably produced by the one-shot process, for example using the high-pressure or low-pressure technique. The foams are obtainable in open or closed metallic molds or via the continuous application of the reaction mixture to belt lines to produce foam blocks.

It is particularly advantageous to proceed via the so-called two-component process wherein, as mentioned above, a polyol component is produced and foamed with polyisocyanate a). The components are preferably mixed at a temperature in the range between 15 and 120° C. and preferably 20 and 80° C. and introduced into the mold or onto the belt line. The temperature in the mold is usually in the range between 15 and 120° C. and preferably between 30 and 80° C.

Flexible polyurethane foams of the present invention are preferably used as cushioning for furniture and mattresses, orthopedic products, such as cushions for example, for cushioning in the automotive sector, such as armrests, headrests and especially auto seats, and possess outstanding processability. More particularly, the isocyanate component is readily miscible with the polyol component to obtain a uniform foam having good mechanical properties. In addition, the high resilience polyurethane foam of the present invention displays outstanding properties after 3 cycles of hot moist storage at 120° C. for 5 hours (1 cycle) in accordance with DIN EN ISO 2440. For instance, the DIN EN ISO 1856 compression set measured after storage and subsequent drying is preferably less than 30% and more preferably less than 25% smaller than before hot moist storage.

The examples which follow illustrate the invention.

The examples were carried out using the following materials:

Polyol 1:
glycerol-initiated polyoxypropylene polyoxyethylene having a polyoxyethylene fraction, based on the alkylene oxide content of 14 wt % and a hydroxyl number of 28.

Polyol 2:
glycerol-initiated polyoxypropylene polyoxyethylene having a polyoxyethylene fraction, based on the alkylene oxide content of 74 wt % and a hydroxyl number of 42.

Polyol 3:
glycerol-initiated polyoxypropylene having a polyoxypropylene fraction, based on the alkylene oxide content of 100 wt % and a hydroxyl number of 42.

Castor Oil
castor oil from ALBERDINGK BOL having a density of 0.96 g/L, a viscosity of 1025 mPas at 25° C. and an OH number of 182 mg KOH/g Isocyanate:
diphenylmethane diisocyanate comprising 71 wt % of monomeric diphenylmethane diisocyanate and 29 wt % of higher-nuclear homologs of diphenylmethane diisocyanate, all based on the total weight of diphenylmethane diisocyanate, wherein the monomeric diphenylmethane diisocyanate comprises 79 wt % of 4,4'-diphenylmethane diisocyanate and 21 wt % of 2,4'-diphenylmethane diisocyanate.

Catalyst I:
33 wt % solution of triethylenediamine in ethylene glycol

Catalyst II:
Polycat® 15, PU catalyst from Air Products

Catalyst III:
3-(dimethylamino)propylamine

Catalyst IV:
JEFFCAT® ZR-50: Pu catalyst from Huntsman

Stabilizer
Tegostab® B 8734 LF from Goldschmidt

Flexible polyurethane foams were produced by polyol component and polyisocyanate component having an isocyanate index of 100 being mixed in the high-pressure process and introduced into a mold. The isocyanate component used was an isocyanate prepolymer, which was obtained by mixing the substances reported in table 1 under "Isocyanate component" and subsequently heating this mixture to 80° C. The polyol component was obtained by mixing the substances reported in table 1 under "Polyol component". The amounts reported are in weight %, based on the total weight of the polyol/isocyanate component.

TABLE 1

|  | inv. 1 | comp. 1 | inv. 2 | inv. 3 | comp. 2 | comp. 3 |
| --- | --- | --- | --- | --- | --- | --- |
| polyol component |  |  |  |  |  |  |
| polyol 1 | 80.0 | 80.0 | 80.0 | 80.0 | 80.0 | 71.4 |
| polyol 2 |  |  |  |  |  | 2.9 |
| polyol 3 |  |  |  |  |  | 5.8 |
| castor oil | 15.0 | 15.0 | 15.0 | 15.0 | 15.0 | 15.0 |
| catalyst I | 0.2 | 0.2 | 0.2 | 0.2 | 0.2 | 0.2 |
| catalyst II | 0.2 | 0.2 | 0.2 | 0.2 | 0.2 | 0.2 |
| catalyst III | 0.2 | 0.2 | 0.2 | 0.2 | 0.2 | 0.2 |
| catalyst IV | 0.2 | 0.2 | 0.2 | 0.2 | 0.2 | 0.2 |
| diethanolamine | 0.4 | 0.4 | 0.4 | 0.4 | 0.4 | 0.4 |
| stabilizer | 0.4 | 0.4 | 0.4 | 0.4 | 0.4 | 0.4 |
| water | 3.4 | 3.4 | 3.4 | 3.4 | 3.4 | 3.4 |
| Isocyanate component |  |  |  |  |  |  |
| isocyanate | 85.0 | 95.0 | 85.0 | 95.0 | 100.0 | 100 |
| polyol 2 | 5.0 | 5.0 | 10.0 | — | — | — |
| polyol 3 | 10.0 | — | 5.0 | 5.0 | — | — |
| NCO content [wt %] | 32.0 | 32.4 | 32.0 | 32.4 | 32.5 | 32.5 |

Mechanical properties of polyurethane foams obtained are reported in table 2. Compressive strength and hysteresis were determined to DIN EN ISO 3386, compression set to DIN EN ISO 2439, tensile strength and elongation at break to DIN EN ISO 1798, air flow value to DIN EN ISO 7231, resilience to DIN EN ISO 8307 and tongue tear strength to DIN ISO 34-1, B (b).

TABLE 2

|  | inv. 1 | comp. 1 | inv. 2 | inv. 3 | comp. 2 | comp. 3 |
| --- | --- | --- | --- | --- | --- | --- |
| compressive strength 25% [kPa] | 3.2 | 3.8 | 2.8 | 3 | 4.2 | 4 |
| compressive strength 40% [kPa] | 4.1 | 4.7 | 3.6 | 3.8 | 5.3 | 5.2 |
| compressive strength 65% [kPa] | 9.2 | 9.4 | 7.6 | 8.5 | 11.8 | 11.8 |
| hysteresis at 70% [%] | 25.3 | 26.2 | 21.9 | 25 | 29.2 | 32.4 |
| overall density [kg/m$^3$] | 47.5 | 47 | 48.1 | 46.3 | 47 | 48.8 |
| compression set [%] | 8.5 | 10.5 | 7.9 | 7.2 | 8.5 | 11.8 |
| tensile strength [kPa] | 102 | 121 | 87 | 81 | 104 | 100 |
| elongation at break [%] | 92 | 96 | 85 | 89 | 81 | 78 |

TABLE 2-continued

|  | inv. 1 | comp. 1 | inv. 2 | inv. 3 | comp. 2 | comp. 3 |
|---|---|---|---|---|---|---|
| air flow value [dm³/s] | 0.9 | 0.792 | 0.888 | 1.043 | 0.639 | n.d. |
| resilience [%] | 52 | 51 | 54 | 52 | 47 | 44 |
| tongue tear resistance [N/mm] | 0.41 | 0.44 | 0.33 | 0.35 | 0.4 | 0.38 |

Mechanical properties after 3 cycles of hot moist aging to DIN EN ISO 2440 are reported in table 3.

TABLE 3

|  | inv. 1 | comp. 1 | inv. 2 | inv. 3 | comp. 2 | comp. 3 |
|---|---|---|---|---|---|---|
| compressive strength 40% [kPa] | 2.7 | 3.3 | 1.9 | 2.5 | 3.6 | 3.8 |
| compression set [%] | 23 | 26 | 12.1 (17.1) | 16.3 (19.3) | 23.2 | 30.6 |
| tensile strength [kPa] | 72 | 75 | 55 | 59 | 72 | 70 |
| elongation at break [%] | 122 | 112 | 110 | 95 | 86 | 85 |
| compressive strength change [%] | 34.1 | 29.8 | 47.2 | 34.2 | 32.1 | 26 |

The examples show clearly that high resilience flexible polyurethane foams of the present invention have very good mechanical properties, especially a low compressive strength, a low compression set and high resilience, especially after hot moist aging.

What is claimed is:

1. A process for producing a high resilience flexible polyurethane foam, the processing comprising mixing
   (a) an isocyanate prepolymer,
   (b) a polymeric compound having an isocyanate-reactive group,
   (c) castor oil,
   (d) optionally a chain-extending and/or crosslinking agent,
   (e) a catalyst,
   (f) a blowing agent, and also optionally
   (g) an additive,
   to form a reaction mixture and reacting the reaction mixture to form a flexible polyurethane foam having a density of 20 to 100 g/l and a resilience of greater than 40% as measured by DIN EN ISO8307,
   wherein more than 5 wt % of (c) castor oil is used, based on the total weight of components (b) to (g), and
   (a) the isocyanate prepolymer is obtained by mixing (a1) diphenylmethane diisocyanate and (a2) a first polyol and also optionally a second polyol, chain extender and/or crosslinker, wherein (a2) the first polyol comprises a polyalkylene oxide polyol having a hydroxyl number of 30 to 60, an average functionality of 2.3 to 3.2 and a propylene oxide fraction, based on the alkylene oxide content of (a2) the first polyol, 100 wt %.

2. The process according to claim 1 wherein (a1) the diphenylmethane diisocyanate comprises from 50 to 80 wt % of monomeric diphenylmethane diisocyanate and from 20 to 50 wt % of a higher-nuclear homolog of diphenylmethane diisocyanate, all based on the total weight of (a1) the diphenylmethane diisocyanate.

3. The process according to claim 2 wherein the monomeric diphenylmethane diisocyanate comprises from 70 to 85 wt % of the 4,4'-isomer of diphenylmethane diisocyanate and from 15 to 30 wt % of 2,4'-isomer of diphenylmethane diisocyanate, all based on the total weight of monomeric diphenylmethane diisocyanate.

4. The process according to claim 1 wherein the isocyanate prepolymer has an isocyanate content of 28 to 33 wt %.

5. The process according to claim 1 wherein (a) the isocyanate prepolymer is obtained by mixing 75 to 99 wt % of (a1) diphenylmethane diisocyanate, 1 to 10 wt % of (a2) the first polyol and 0 to 15 wt % of the second polyol, wherein the second polyol comprises a polyalkylene oxide polyol having a hydroxyl number of 30 to 60, an average functionality of 2.3 to 3.2 and an ethylene oxide fraction, based on the alkylene oxide content of the second polyol, of 70 to 90 wt %.

6. The process according to claim 5 wherein the portion of (a) isocyanate prepolymer that is attributable to the second polyol is in the range from 2 to 15 wt %.

7. The process according to claim 1 wherein the proportion of the total weight of components (b) to (g) that is attributable to (c) castor oil is greater than 10 wt %.

8. The process according to claim 1 wherein the process is carried out at an isocyanate index in the range from 70 to 125.

9. A high resilience polyurethane foam obtained by the process according to claim 1.

10. An auto seat comprising the polyurethane foam according to claim 9.

* * * * *